Patented July 28, 1931

1,815,983

UNITED STATES PATENT OFFICE

EMIL MAUERHOFF, OF DESSAU, GERMANY, ASSIGNOR, BY MESNE ASSIGNMENTS, TO AGFA ANSCO CORPORATION, OF BINGHAMTON, NEW YORK, A CORPORATION OF NEW YORK

SILVER HALID EMULSION AND PROCESS OF MAKING THE SAME

No Drawing. Application filed December 28, 1926, Serial No. 157,606, and in Germany October 10, 1925.
Renewed June 4, 1930.

I have filed an application for this invention in Germany A 46 124 VI/57 b, filed October 10, 1925.

The sensitivity reached in manufacturing silver halid emulsions depends highly on the gelatine employed. While it is possible with a certain sort of gelatine to attain without any difficulty the desired degree of photographic sensitivity, other gelatines yield only very hardly or not at all emulsions of a practically useful sensitivity.

The process of preparing sensitivity increasing products by alkaline and fermentative hydrolysis and a simultaneous partial oxidation of vegetable or animal proteins is claimed in the co-pending specification Serial Number 127,708, Matthies, Dieterle & Reitstoetter, filed August 6, 1926. What I claim in the present specification is the process of manufacturing photographic emulsions of high sensitivity by adding in emulsion making products of decomposition of vegetable or animal proteins prepared by acid hydrolysis and a simultaneous partial oxidation. These products of hydrolysis, after having been neutralized, can be added directly in the diluted form as they are gathered, or the effective compounds contained therein may first be enriched or isolated. The products of decomposition may be prepared, e. g. from albumin, keratin, gelatine, cystine, animal hide, tendons, cartilages, horn, bone or other raw materials for glue and gelatine.

It has already been proposed to increase the sensitivity of silver halid emulsions by adding during emulsion making products resulting from a treatment of proteins but it has been supposed up to now that decomposition in this process would be detrimental for the faculty of sensitivity increasing and it has always been prescribed to thoroughly avoid any oxidation or bacterial action, i. e. fermentative influence. Thus proteins heretofore have been acted upon with the purpose of producing sensitivity increasing products only in a very mild way. So it has been suggested to extract gelatine with distilled water at 30° C. or to extract deliming solutions or powdered pods with organic solvents. I have found that just by decomposition of proteins highly valuable products for the purpose set forth can be obtained. The decomposition may be carried on by acid hydrolysis and by initiating oxidation. Such a treatment has been thought to be highly harmful in prior art. It is obvious that the products obtained according to my present invention differ greatly from any prior products intended for the same purpose, since they are breakdown products whilst heretofore only extracts have been thought applicable. Furthermore the products extracted by organic solvents are distinguished from my breakdown products by their solubility. My breakdown products are only water soluble.

Since all proteins from animal as well as from vegetable sources may be regarded as aggregates combined of a few fundamental units in varying amounts and in various configurations, the decomposition of any proteins according to the present invention finally yields a solution of nearly the same products, the amount of which only varies with the different sources of material.

In preparing these products the point at which the decomposition by acid hydrolysis and partial oxidation is to be stopped, is determined by the refractive index curve of the solution and by testing at regular intervals the photographic qualities of the decomposition products. During the decomposing of proteins the solution shows the continuous increasing of the refractive index which tends to reach a constant value when all protein present has been broken down. The photographic test is carried out by making a little batch of emulsion with addition of varying amounts of the product to be tested. From the sensitogram of the resulting emulsion the photographic qualities of the product are easily judged. The decomposing treatment is interrupted when a photographic optimum is reached. In the same way the quantity necessary for any emulsion may be determined.

With addition of these products during emulsion making to the constituents of the emulsion or only to the finished emulsion, one succeeds to obtain high speed emulsions, though employing a photographically unsensitive gelatine.

*Example*

Boil for 1 hour 50 g. of gelatine with 5 or 10 ccm. of conc. nitric acid and 450 ccm. of water. Neutralize the solution with potassium hydroxide and evaporate it to dryness. The powder thus obtained may be added to one of the components prior to emulsion making or to the mixture during emulsion making. It may be added to the solution of halides or to the gelatine, the acid being neutralized by an alkali. When using it in an amount of 2½ per cent. calculated on the quantity of the gelatine contained in the emulsion batch, the sensitivity of the emulsion can be increased to the thirtyfold value.

The present application contains subject matter in common with the co-pending application Ser. No. 127,708, filed Aug. 6, 1926.

Having now particularly described and ascertained the nature of my said invention and in what manner it is to be performed I declare that what I claim is:

1. In the manufacture of photographic silver halid emulsions, the addition to the emulsion of a sensitivity increasing material prepared by acid hydrolysis and simultaneous partial oxidation of proteins.

2. In the manufacture of photographic silver halid emulsions, the addition to a constituent of the emulsion of a sensitivity increasing material prepared by acid hydrolysis and simultaneous partial oxidation of proteins.

3. Silver halid emulsions containing added sensitivity increasing material prepared by the acid hydrolysis and simultaneous partial oxidation of proteins.

4. Photographic layers comprising the silver halid emulsions defined in claim 3.

5. A gelatine for photographic silver salt emulsions containing a sensitivity-increasing material being a protein degradation product prepared by subjecting the protein to acid hydrolysis and a simultaneous partial oxidation.

6. A gelatine for photographic silver halid emulsions containing a sensitivity-increasing material being a protein degradation product prepared by subjecting the protein to acid hydrolysis and simultaneous partial oxidation.

7. A gelatine for photographic silver halid emulsions containing a sensitivity-increasing material being a gelatine degradation product prepared by subjecting the gelatine to acid hydrolysis and simultaneous partial oxidation.

8. A gelatine for photographic silver halid emulsions, being a gelatine otherwise photographically insensitive to which has been added a sensitivity-increasing material being a gelatine degradation product prepared by subjecting gelatine to acid hydrolysis and simultaneous partial oxidation.

9. Process for increasing the photographic sensitivity of a gelatine which comprises treating the gelatine with a protein degradation product obtained by acid hydrolysis and simultaneous partial oxidation of a protein and having sensitivity-increasing properties.

10. Process for imparting photographic sensitivity to a gelatine otherwise photographically insensitive which comprises treating the photographically insensitive gelatine with a protein degradation product obtained by acid hydrolysis and simultaneous partial oxidation of a protein and having sensitivity-increasing properties.

11. Process for increasing the photographic sensitivity of a gelatine which comprises treating a gelatine with a gelatine degradation product obtained by acid hydrolysis and simultaneous partial oxidation of a gelatine and having sensitivity-increasing properties.

12. Process for imparting photographic sensitivity to a gelatine otherwise photographically insensitive which comprises treating a photographically insensitive gelatine with a gelatine degradation product obtained by acid hydrolysis and simultaneous partial oxidation of a gelatine and having sensitivity-increasing properties.

In testimony whereof I have affixed my signature.

EMIL MAUERHOFF.